(12) United States Patent
Fu et al.

(10) Patent No.: US 12,049,148 B2
(45) Date of Patent: Jul. 30, 2024

(54) DUAL-PURPOSE DRIVE AND CHARGER SYSTEMS AND METHODS THEREOF

(71) Applicant: Deere & Company, Moline, IL (US)

(72) Inventors: Tianjun Fu, Fargo, ND (US); Yuheng Wu, Fayetteville, AR (US); Long Wu, Fargo, ND (US); Danielle Li, Fargo, ND (US); David M. Loken, West Fargo, ND (US); Richard E. Wainwright, West Fargo, ND (US)

(73) Assignee: Deere & Company, Moline, IL (US)

( * ) Notice: Subject to any disclaimer, the term of this patent is extended or adjusted under 35 U.S.C. 154(b) by 486 days.

(21) Appl. No.: 17/380,272

(22) Filed: Jul. 20, 2021

(65) Prior Publication Data

US 2023/0031930 A1 Feb. 2, 2023

(51) Int. Cl.
  *B60L 53/24* (2019.01)
  *B60L 50/51* (2019.01)
(52) U.S. Cl.
  CPC ............. *B60L 53/24* (2019.02); *B60L 50/51* (2019.02); *B60L 2210/40* (2013.01)
(58) Field of Classification Search
  CPC ...... B60L 53/24; B60L 50/51; B60L 2210/40; Y02T 10/70; Y02T 90/14; Y02T 10/7072; H02J 2207/20; H02J 7/02
  See application file for complete search history.

(56) References Cited

U.S. PATENT DOCUMENTS

| 11,811,257 B2* | 11/2023 | Cassarino ............ H02J 7/1423 |
| 2008/0211471 A1 | 9/2008 | Liao et al. |
| 2018/0334043 A1 | 11/2018 | Zou et al. |
| 2019/0061553 A1* | 2/2019 | Yang ..................... B60L 58/22 |
| 2019/0126763 A1 | 5/2019 | Najmabadi et al. |
| 2019/0363660 A1 | 11/2019 | Mao |

FOREIGN PATENT DOCUMENTS

| KR | 20210084755 A | 7/2021 |
| WO | WO2021074661 A1 | 4/2021 |

OTHER PUBLICATIONS

"The Discontinuous Conduction Mode" Origin of the Discontinuous Conduction Mode, and Mode Boundary, 5.1, pp. 107-130.
X. Zhou et al. "High-Frequency Resonance Mitigation for Plug-In Hybrid Electric Vehicles' Integration With a Wide Range of Grid Conditions" IEEE Transactions on Power Electronics, vol. 27, No. 11, Nov. 2012, pp. 4459-4471.

(Continued)

*Primary Examiner* — Russell Frejd
*Assistant Examiner* — Ana D Thomas
(74) *Attorney, Agent, or Firm* — Harness, Dickey & Pierce, P.L.C.

(57) ABSTRACT

In an example embodiment, a system includes a plurality of inverters configured to operate in at least one of a charging mode or a drive mode, a plurality of motors and at least one controller configured to selectively couple the plurality of inverters to the plurality of motors during a drive mode, and selectively couple at least one of the inverters to an alternating current (AC) source during the charging mode and decouple the at least one of the inverters from the plurality of motors during the charging mode.

16 Claims, 13 Drawing Sheets

(56) References Cited

OTHER PUBLICATIONS

S. Zhang et al. "A Unified Analytical Modeling of the Interleaved Pulse Width Modulation (PWM) DC-DC Converter and Its Applications" IEEE Transactions on Power Electronics, vol. 28, No. 11, Nov. 2013, pp. 5147-5158.
J.R. Pinheiro et al. "Isolated Interleaved-Phase-Shift-PMW dc-dc ZVS Converters" IEEE, copyright 2000, pp. 2383-2388.
T. Na et al. "A Review of on-Board Integrated Electric Vehicles Charger and a New Single-Phase Integrated Charger" CPSS Transactions on power electronics and applications, vol. 4, No. 4, Dec. 2019, pp. 288-298.
T. Na et al. "A Review of On-Board Integrated Charger for Electric Vehicles and A New Solution" National Natural Science Foundation of China, downloaded Apr. 20, 2021, pp. 693-699.
S. Ebrahimi et al. "A Single-Phase Integrated Bidirectional Plug-In Hybrid Electric Vehicle Battery Charger" IEEE copyright 2014, pp. 1137-1142.
J. Lim et al. "A Power-Factor Controller for Single-Phase PWM Rectifiers" IEEE Transactions on Industrial Electronics, vol. 46, No. 5, Oct. 1999, p. 1035-1037.
H. Zhang et al. "Capacitance, dc Voltage Utilization, and Current Stress" IEEE Industrial Electronics Magazine, Sep. 2017, pp. 37-49.
Extended European Search Report and Written Opinion issued in European Patent Application No. 22182667.0, dated Dec. 8, 2022, in 08 pages.

\* cited by examiner

DUAL-PURPOSE DRIVE AND CHARGER SYSTEMS AND METHODS THEREOF

FIELD

Example embodiments are related to drive systems and charger systems such as dual-purpose drive and charger systems.

BACKGROUND

In a conventional electric vehicle, an on-board charger is usually a stand-alone part, which means that the manufacturer needs to purchase or design a fully functional stand-alone on-board charger and install it on the vehicle.

The stand-alone on-board charger will increase the hardware cost. Meanwhile, the stand-alone charger will also occupy extra space inside the vehicle.

SUMMARY

At least some example embodiments provide an integrated on-board charger that reduces the hardware cost and system volume compared to conventional systems. Moreover, an on-board charger solution according to at least some example embodiments reduces charging current ripples by utilizing an interleaving technique along with double line frequency ripple reduction.

At least one example embodiment provides a system includes a plurality of inverters configured to operate in at least one of a charging mode or a drive mode, a plurality of motors and at least one controller configured to selectively couple the plurality of inverters to the plurality of motors during a drive mode, and selectively couple at least one of the inverters to an alternating current (AC) source during the charging mode and decouple the at least one of the inverters from the plurality of motors during the charging mode.

BRIEF DESCRIPTION OF THE DRAWINGS

Example embodiments will be more clearly understood from the following detailed description taken in conjunction with the accompanying drawings. FIGS. 1-8D represent non-limiting, example embodiments as described herein.

FIG. 3 illustrates a simplified battery model;

FIG. 5 illustrates an active front-end (AFE) controller according to at least one example embodiment;

FIG. 6 illustrates a frequency response of a notch filter with different damping ratios according to at least one example embodiment;

FIG. 7 illustrates a buck controller according to at least one example embodiment; and FIGS. 8A-8D illustrate a charging operation according to at least one example embodiment.

DETAILED DESCRIPTION

Figure 1A:
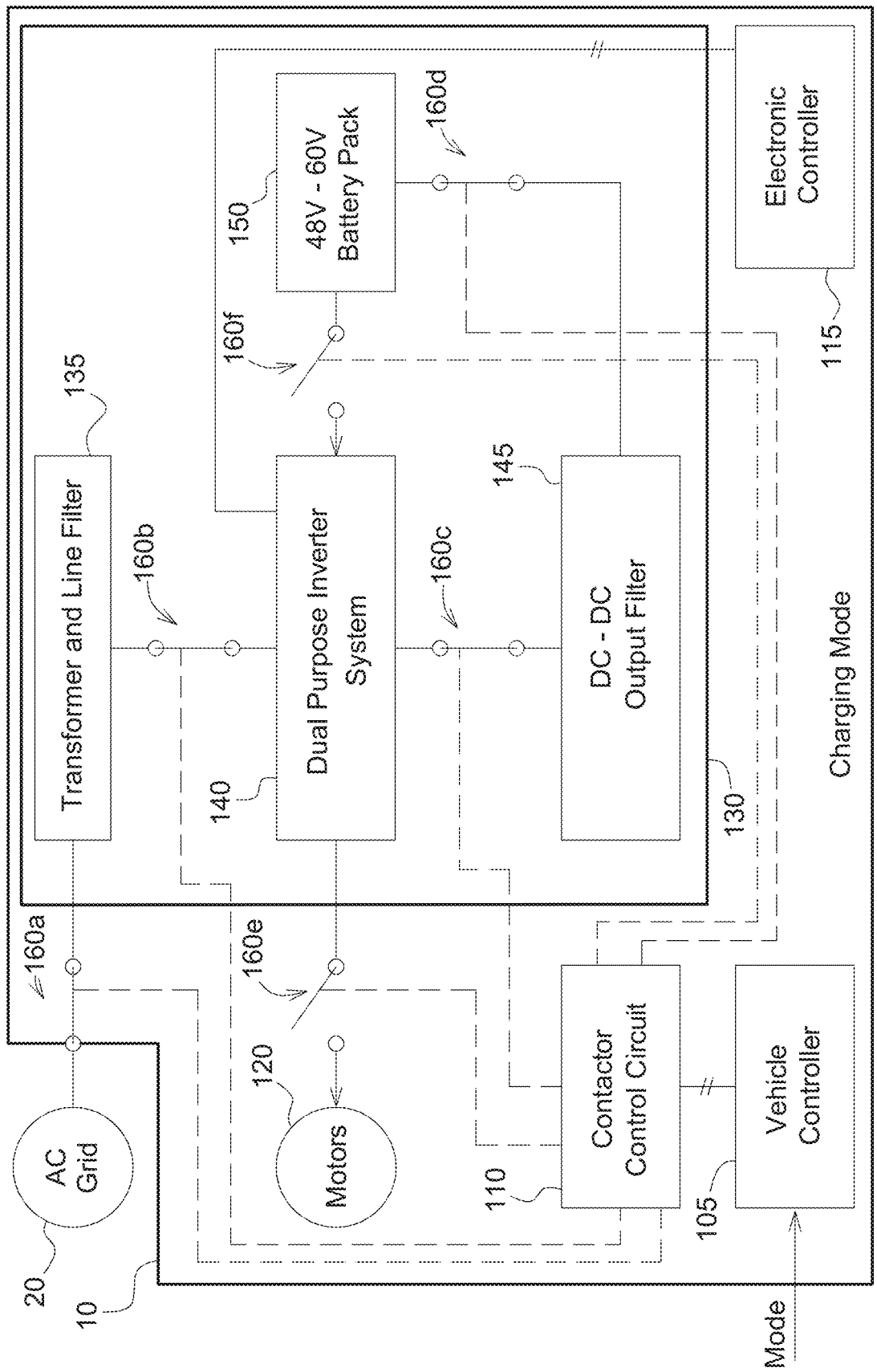
FIG. 1A illustrates a vehicle system in a charging mode according to at least one example embodiment.

Some example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware.

Such existing hardware (e.g., data processors and controllers) may be implemented using processing or control circuitry such as, but not limited to, one or more processors, one or more Central Processing Units (CPUs), one or more microcontrollers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits.

Further, at least one embodiment of the invention relates to a non-transitory computer-readable storage medium comprising electronically readable control information stored thereon, configured such that when the storage medium is used in a controller of a motor system, at least one embodiment of the method is carried out.

Even further, any of the aforementioned methods may be embodied in the form of a program. The program may be stored on a non-transitory computer readable medium and is adapted to perform any one of the aforementioned methods when run on a computer device (a device including a processor). Thus, the non-transitory, tangible computer readable medium is adapted to store information and is adapted to interact with a data processing facility or computer device to execute the program of any of the above mentioned embodiments and/or to perform the method of any of the above mentioned embodiments.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects.

The term memory is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways. The term data storage device may be used interchangeably with computer-readable medium.

Figure 1B:
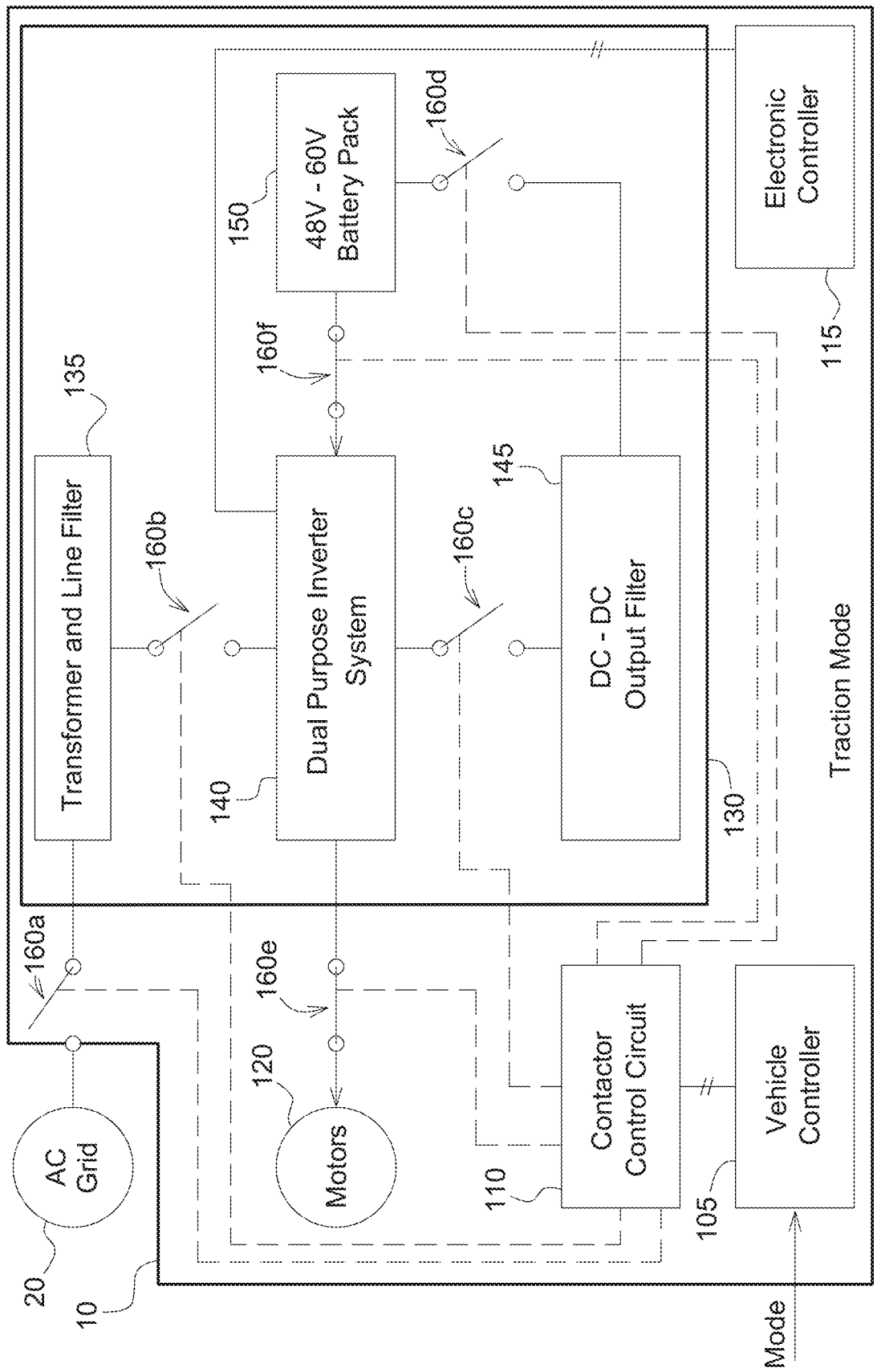
FIG. 1B illustrates a vehicle system in a traction mode according to at least one example embodiment.

FIG. 1A illustrates a vehicle system in a charging mode according to at least one example embodiment. FIG. 1B illustrates a vehicle system in a traction mode according to at least one example embodiment.

In at least one example embodiment, the vehicle system includes a plurality of inverters configured to operate in at least one of a charging mode or a drive mode, a plurality of motors and at least one controller configured to selectively couple the plurality of inverters to the plurality of motors during a drive mode, and selectively couple at least one of the inverters to an alternating current (AC) source during the charging mode and decouple the at least one of the inverters from the plurality of motors during the charging mode. The drive mode may also be referred to as the traction mode or a motoring mode.

In at least one example embodiment, the plurality of inverters includes a first inverter, a first portion of the first inverter is configured to operate as part of an AC to direct current (DC) converter during the charging mode, and a second portion of the first inverter is configured to operate as part of a DC-DC converter.

In at least one example embodiment, the second portion of the first inverter includes at least one half-bridge, the at least one half-bridge including a first transistor and a second transistor, wherein the at least one controller is configured to activate and deactivate the first transistor and the second transistor using a synchronous rectification based method.

In at least one example embodiment, the at least one controller is configured to activate the second transistor when the first transistor is deactivated in a discontinued-conduction-mode (DCM) operation.

In at least one example embodiment, the at least one controller is configured to deactivate the second transistor before an inductor current is zero in the discontinued-conduction-mode (DCM) operation.

In at least one example embodiment, the at least one controller is configured to control the first portion of the first inverter during the charging mode based on a DC bus reference voltage.

In at least one example embodiment, the at least one controller includes a proportional-integral-resonant (PIR) controller, a proportional-integral (PI) controller, phase-locked-loop (PLL) controller and a notch filter.

In at least one example embodiment, the charging mode includes a constant current (CC) mode and a constant voltage (CV) mode and the at least one controller is configured to cause the system to operate in a CC mode or CV mode during the charging mode.

In at least one example embodiment, the at least one controller includes two proportional-integral-resonant (PIR) controllers for the CC mode and CV mode operation during the charging mode, and a look-up table.

In at least one example embodiment, the system further includes a battery and an LC-type or an LCL-type low-pass filter, the LC-type or the LCL-type low-pass filter being connected between the battery and the DC-DC converter.

In at least one example embodiment, the system further includes a transformer to convert AC voltage from the AC source from a first AC voltage to a second AC voltage.

In at least one example embodiment, the plurality of inverters includes a dual inverter or a triple inverter.

In at least one example embodiment, the system further includes an interleaved single-phase AC-DC converter during the charging mode and an interleaved DC-DC buck converter during the charging mode.

At least one example embodiment provides a computer-readable medium, when executed by at least one controller, configured to cause a vehicle system to selectively couple a plurality of inverters to a plurality of motors during a drive mode, and selectively couple at least one of the inverters to an alternating current (AC) source during the charging mode and decouple the at least one of the inverters from the plurality of motors during the charging mode.

In at least one example embodiment, the computer-readable medium, when executed by the at least one controller, is configured to cause the vehicle system to execute a proportional-integral-resonant (PIR) controller, a proportional-integral (PI) controller, phase-locked-loop (PLL) controller and a notch filter.

In at least one example embodiment, the computer-readable medium, when executed by the at least one controller, is configured to cause the vehicle system to operate in one of a constant current (CC) mode or a constant voltage (CV) mode during the charging mode.

In at least one example embodiment, the vehicle system includes a plurality of inverters configured to operate in at least one of a charging mode or a drive mode, a plurality of motors and means for selectively coupling the plurality of inverters to the plurality of motors during a drive mode, and selectively coupling at least one of the inverters to an alternating current (AC) source during the charging mode and decouple the at least one of the inverters from the plurality of motors during the charging mode.

In at least one example embodiment, the second portion of the first inverter includes at least one half-bridge, the at least one half-bridge including a first transistor and a second transistor, and the vehicle system includes means for activating and deactivating the first transistor and the second transistor using a synchronous rectification based method.

In at least one example embodiment, the vehicle system includes means for activating the second transistor when the first transistor is deactivated in a discontinued-conduction-mode (DCM) operation.

In at least one example embodiment, the vehicle system includes means for deactivating the second transistor before an inductor current is zero in the discontinued-conduction-mode (DCM) operation.

In at least one example embodiment, the vehicle system includes means for controlling the first portion of the first inverter during the charging mode based on a DC bus reference voltage.

In at least one example embodiment, the means for controlling includes a proportional-integral-resonant (PIR) controller, a proportional-integral (PI) controller, phase-locked-loop (PLL) controller and a notch filter.

In at least one example embodiment, the charging mode includes a constant current (CC) mode and a constant voltage (CV) mode and the means for controlling is configured to cause the system to operate in a CC mode or CV mode during the charging mode.

In at least one example embodiment, the means for controlling includes two proportional-integral-resonant (PIR) controllers for the CC mode and CV mode operation during the charging mode, and a look-up table.

As shown in FIGS. 1A-1B, a vehicle system 10 may include a vehicle controller 105, a contactor control circuit 110, an electronic controller 115, a plurality of motors 120 and integrated charging and drive control circuitry 130. The integrated charging and drive control circuitry 130 may include a transformer and line filter 135 (e.g., a transformer and line filter), a dual purpose inverter system 140, a DC-DC output filter 145 and a power supply 150 (e.g., a 48 V-60 V battery pack).

As will be described, the dual purpose inverter system 140 includes a plurality of inverters. A portion of the inverter system 140 is configured to operate as part of an AC-DC converter during the charging mode and a second portion of the dual purpose inverter system 140 is configured to operate as part of a DC-DC converter.

The vehicle controller 105 controls the contactor control circuit 110 to selectively couple the plurality of inverters to the plurality of motors during a drive mode (also referred to as a traction mode or a motoring mode), and selectively couple at least one of the inverters to an alternating current (AC) source during the charging mode and decouple the at least one of the inverters from the plurality of motors during the charging mode.

Referring to FIG. 1A, in the charging mode, the vehicle controller 105 provides a signal to the contactor control circuit 110 to close a switch 160*a* to connect an AC grid 20 to the transformer and line filter 135. In an example embodiment, the AC grid 20 provides an input voltage (RMS) of 120 V with an input current (RMS) of 45 A or a voltage of 240 V with a current of 22.5 A. An operator may set a mode signal by selecting the control mode (e.g., charging mode or traction mode) by pushing a button or using an interface such as a touch screen on a vehicle. The mode signal indicates whether the vehicle system 10 is to operate in at least one of a charging mode or a traction mode. In other example embodiments, the vehicle controller 105 may select the control mode and set the mode signal based on whether the vehicle system 10 is connected to the grid 20 and whether the motors 120 are running. For example, the vehicle controller 105 may set the mode signal to a charging mode if the vehicle system 10 is connected to the grid 20 and the motors 120 are not running.

In a same signal or different signal to the contact control circuit 110 to close a switch 160*a*, the vehicle controller 105 also provides instructions to the contactor control circuit 110 to close a switch 160*b* to connect transformer and line filter 135 to the dual purpose inverter system 140, to close a switch 160*c* to connect the dual purpose inverter system 140 to the DC-DC filter 145, and to close a switch 160*d* to connect the DC-DC filter 145 to the power supply 150. In at least some example embodiments, the power supply 150 is a battery pack. In the charging mode, the vehicle controller 105 and the contactor control circuit 110 collectively operate to open switches 160*e* and 160*f* and when the traction motor control is disabled.

As shown in FIG. 1A, the dual purpose inverter system 140 is configured to operate as a DC/DC buck converter during the charging mode.

Referring to FIG. 1B, in the traction mode, the vehicle controller 105 provides a signal to the contactor control circuit 110 to close the switch 160*e* to connect the plurality of motors 120 to the dual purpose inverter system 140.

In a same signal or different signal to the contact control circuit 110 to close the switch 160*e*, the vehicle controller 105 also provides instructions to the contactor control circuit 110 to close a switch 160*f* to connect the dual purpose inverter system 140 to the power supply 150. In the traction mode, the vehicle controller 105 and the contactor control circuit 110 collectively operate to open switches 160*a*, 160*b*, 160*c* and 160*d* during the traction mode.

The vehicle controller 105 may be implemented as hardware, such as a processor, firmware or hardware executing software as a special purpose machine. When the vehicle controller 105 is hardware, such hardware may include one or more Central Processing Units (CPUs), digital signal processors (DSPs), application-specific-integrated-circuits (ASICs), field programmable gate arrays (FPGAs) computers or the like configured as special purpose machines to perform the functions of described herein. CPUs, DSPs, ASICs and FPGAs may generally be referred to as processors and/or microprocessors.

In the event that the vehicle controller 105 is a processor executing software, the processor is configured as special purpose machine to execute the software to perform the functions of the vehicle controller 105.

In an example embodiment, the vehicle controller 105 is a vehicle control unit (VCU).

Figure 2A:
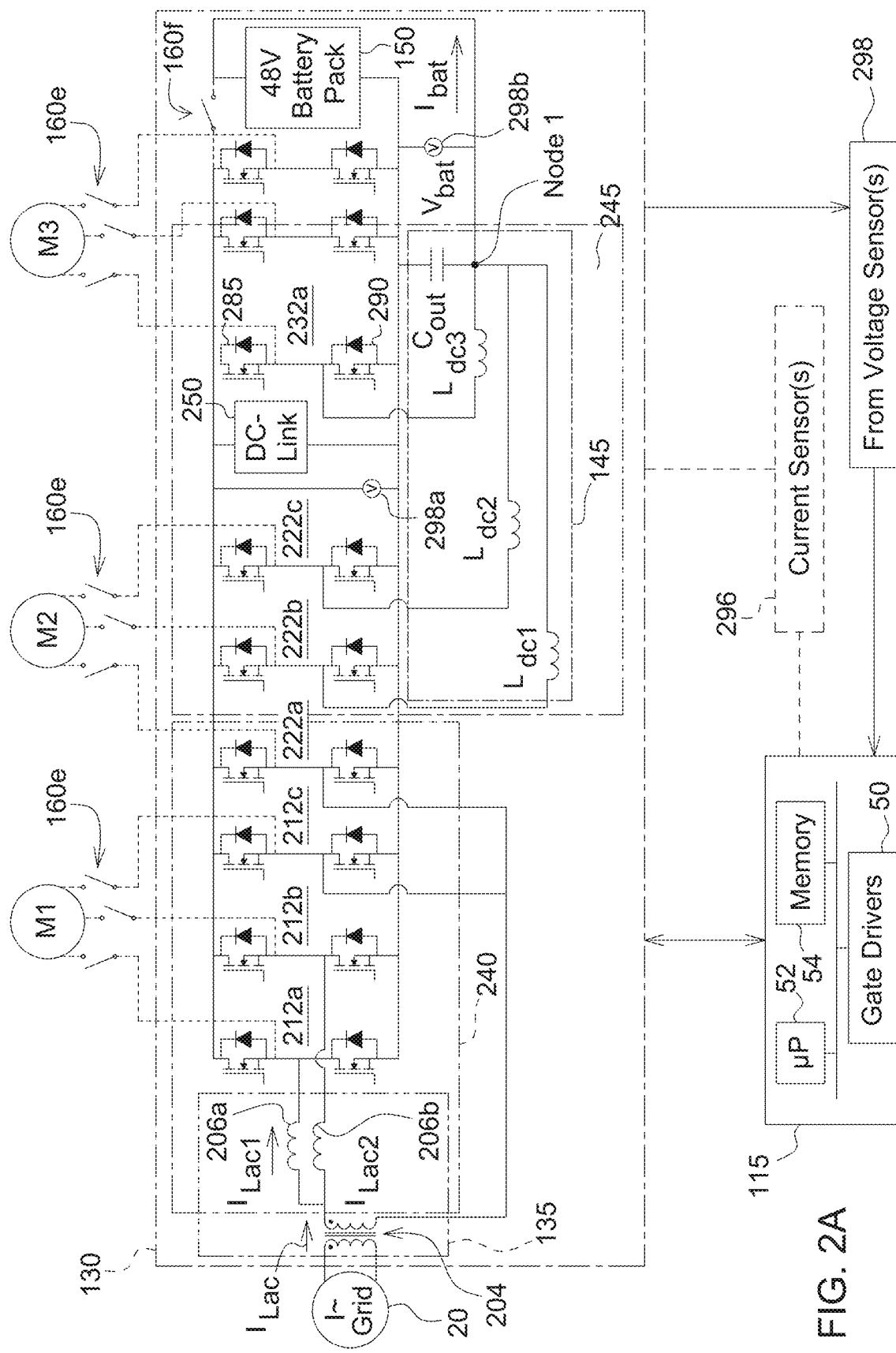
FIG. 2A illustrates an integrated charging and drive control circuitry in a charging mode according to at least one example embodiment.
Figure 2B:
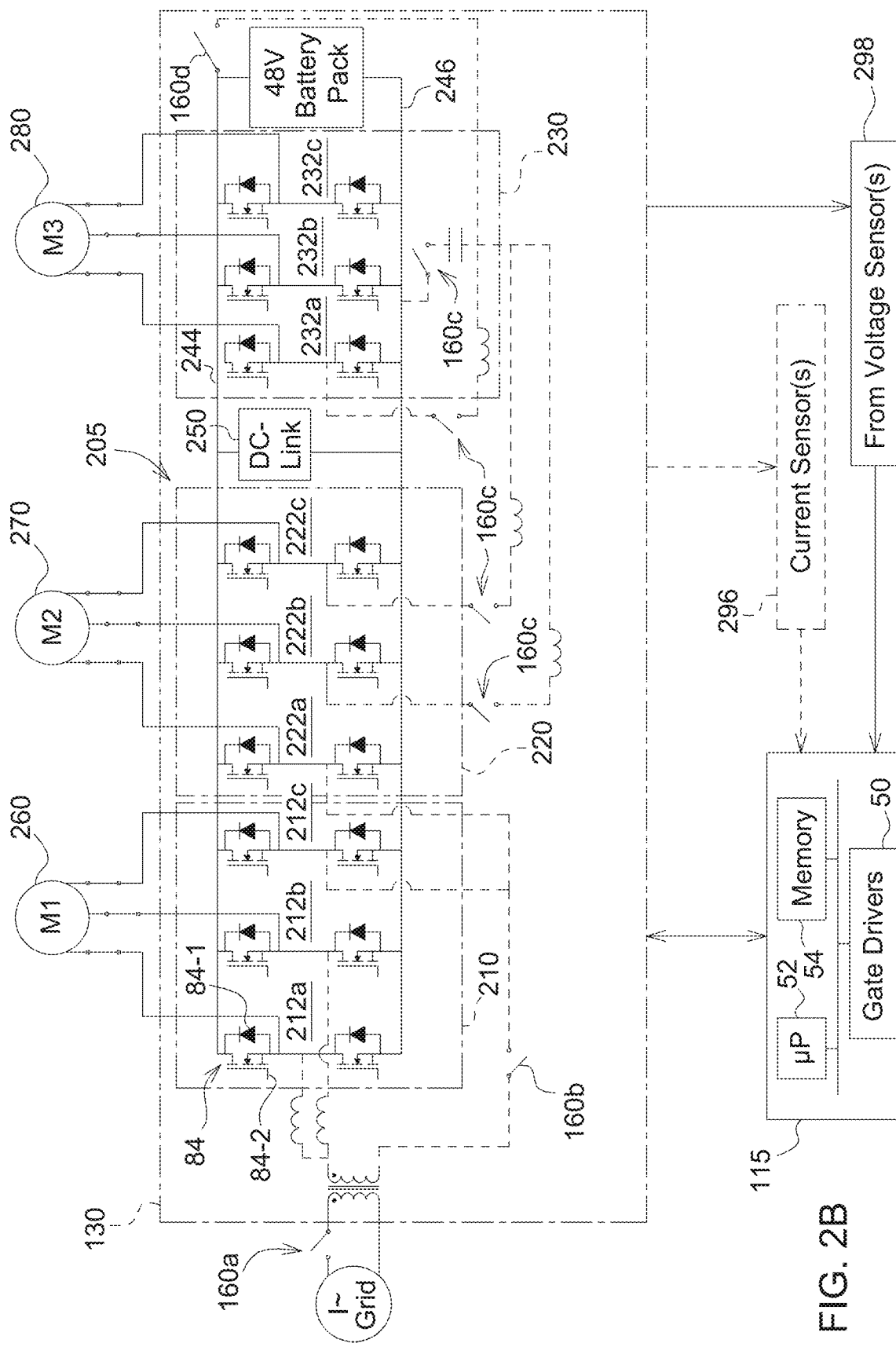
FIG. 2B illustrates an integrated charging and drive control circuitry in a traction mode according to at least one example embodiment.

FIG. 2A illustrates an integrated charging and drive control circuitry in a charging mode according to an example embodiment. FIG. 2B illustrates an integrated charging and drive control circuitry in a traction mode according to an example embodiment.

In FIGS. 2A-2B, lines and elements that are dashed (instead of black) indicate they are operably disconnected from the system during a particular mode (with the exception of the current sensor(s), which indicates the use of a current sensor may occur in some example embodiments). For example, the dual purpose inverter system 140 includes a plurality of inverters 205, which includes a first inverter 210, a second inverter 220 and a third inverter 230. Each of the first inverter 210, the second inverter 220 and the third inverter 230 is coupled electrically between a motor and rails 244, 246. Rail 244 may be a high-side line and rail 246 may be a low-side line.

In some example embodiments, the system 10 (shown in FIG. 1A) reduces high-frequency ripples in battery charging currents and the controller 115 reduces the impact of double line-frequency ripples in a AFE DC-link output voltage, which is caused by the single-phase power source (the grid 20) and can deteriorate the charging performance.

In the charging mode, and as described in at least one example embodiment below, the first inverter 210, the second inverter 220 and a portion of the third inverter 230 operate to charge the power supply 150. In the traction mode, and as described in at least one example embodiment below, the first inverter 210, the second inverter 220 and the third inverter 230 operate to drive the motors 120 and consume power from the power supply 150.

The first inverter 210 includes half-bridges 212*a*, 212*b* and 212*c*. The second inverter 220 includes half-bridges 222*a*, 222*b* and 222*c*. The third inverter 230 includes half-bridges 232*a*, 232*b* and 232*c*.

Each half-bridge includes two switch packages 84 that are placed across a DC-link 250. One switch package 84 in each half-bridge is a top-side 285 of the half-bridge and the other switch package 84 is a bottom side 290 of the half-bridge. In an example, the DC-link 250 has a capacitance of 2.7 mF and a rate voltage of 80 V. However, it should be understood that in other example embodiments, the capacitance of the DC-link 250 and the rate voltage may be different.

Each switch package 84 includes a diode 84-1 and a MOSFET transistor 84-2.

In the example shown in FIGS. 2A-2B, the transformer and line filter 135 includes a single-phase transformer 204 having a primary side connected to the grid 20 and a secondary side connected first ends of a pair of inductors 206*a* and 206*b*. Second ends of the pair of inductors 206*a* and 206*b* are connected to half-bridges of the first inverter 210, respectively.

In the charging mode shown in FIG. 2A, the dual purpose inverter system 140 includes an active-front-end (AFE) converter 240 and an interleaved DC/DC buck converter 245. The controller 115 controls the AFE converter 240 to operate as an interleaved single-phase AFE converter.

The interleaved single-phase AFE 240 includes two individual phase AFEs that are interleaved (each phase includes two half-bridges). By shifting a PWM carrier phase for switching control, the harmonics of a total current contributed from the two individual AFEs can be reduced. In at least some example embodiments, half-bridges 212*a* and 212*c* form a first single phase AFE and half-bridges 212*b* and 222*a* form a second single phase AFE. The two phases are shifted 180 degrees apart. The interleaved single-phase AFE 240 consists of the first AFE and the second AFE.

The AFE converter 240 includes the first inverter 210 (e.g., three half bridges) and one half-bridge of the second inverter 220. The interleaved buck converter 245 includes two half-bridges of the second inverter 220 and one half bridge of the third inverter 230.

The switching frequency of the MOSFETS 84-2 in the AFE 1030 may be 15 kHz.

In the charging mode shown in FIG. 2A, the single-phase transformer 204 may be a line-frequency step-down transformer to reduce the AC input voltage of the AFE converter 240, as the rated voltages of the MOSFETs 84-2 and the DC-link 250 is 80 V. However, example embodiments are not limited thereto.

In an example embodiment, the transformer turns ratio of the transformer 204 is determined based on the voltage of the AC source 20 and the output DC voltage of the AFE converter 240. The output DC voltage of the AFE 240 (i.e., voltage of the DC-Link 250) is determined by the voltage of the power supply 150. In a buck control mode, the DC-link voltage may be higher than the voltage of the power supply 150.

In an example embodiment, the transformer turns ratio of the transformer 204 is larger than 5.94:1, such as 6:1.

The pair of inductors 206a and 206b may operate as a line filter for the AFE converter 240. While illustrated as being separate from the AFE converter 240, it should be understood that the pair of inductors 206a and 206b may be considered part of the AFE converter 240 in other embodiments. Each of the inductors 206a and 206b may have an inductance of 30 pH, and a zero-crossing frequency of about 5.3 kHz. However, example embodiments are not limited thereto.

While an LC-filter is shown, in other example embodiments an LCL filter may be used. In example embodiments where an LCL filter is used, an inductor $L_{bat}$ is included. The inductor $L_{bat}$ may be considered a cable impedance or extra inductor.

The switch packages 84 of the half-bridges 212a, 212b, 212c and 222a are coupled to an end of the transformer and line filter 135. For example, the half-bridge 212a is connected to the second end of the inductor 206a, the half-bridge 212b is connected to the second end of the inductor 206b and the half-bridges 212c and 222a are connected to the transformer. In the charging mode, the half-bridges 212a, 212b, 212c and 222a convert AC power from the grid 20 through the transformer 204 into DC power on the DC-link 250. While the inductors 206a and 206b are illustrated as part of the transformer and line filter 135 in some example embodiments, the inductors 206a and 206b (forming the line filter) may be considered part of the AFE converter 240 in other example.

When the appropriate voltage is applied to the gate of an MOSFET transistor 84-2, the transistor 84-2 may be activated and the drain may be coupled electrically to the emitter to supply electric power. The appropriate voltage depends on a rating of the transistor 84-2. For example, 14 V may be applied at the gate to turn the transistor 84-2 on. Negative 8 V may be applied at the gate to turn the transistor 84-2 off.

Although MOSFET transistors are shown, IGBTs (insulated-gate bipolar transistors), field effect transistors, complementary metal oxide semiconductors, power transistors, or other suitable semiconductor devices may be used.

As used in this document, switch states indicate whether a properly functioning or unimpaired semiconductor device is active ("on" or "closed") or inactive ("off" or "open"). A failure of a semiconductor device to change states may result in a semiconductor device failing in an open state or a closed state, for example.

The controller 115 may have gate drivers 50, a microprocessor 52 coupled electrically to the gate drivers 50, and memory 54 coupled electrically to the microprocessor 52 and having stored therein operating instructions for the microprocessor 52. The gate of each transistor 84-2 is coupled electrically to a respective gate driver 50 that is dedicated to that transistor 84-2 and may provide a low DC voltage (e.g., 24 V) to turn on and off that transistor 84-2. Thus, there may be a gate driver 50 for each transistor 84-2. The gate drivers 50 for the transistor 84-2 are under the control of the microprocessor 52, which may employ a pulse-width-modulation control scheme to control those gate drivers 50 and the transistor 84-2 to supply electric energy to charge the power supply 150 in the charging mode and consume the electric energy from the power supply 150 in the traction mode.

Figure 5:
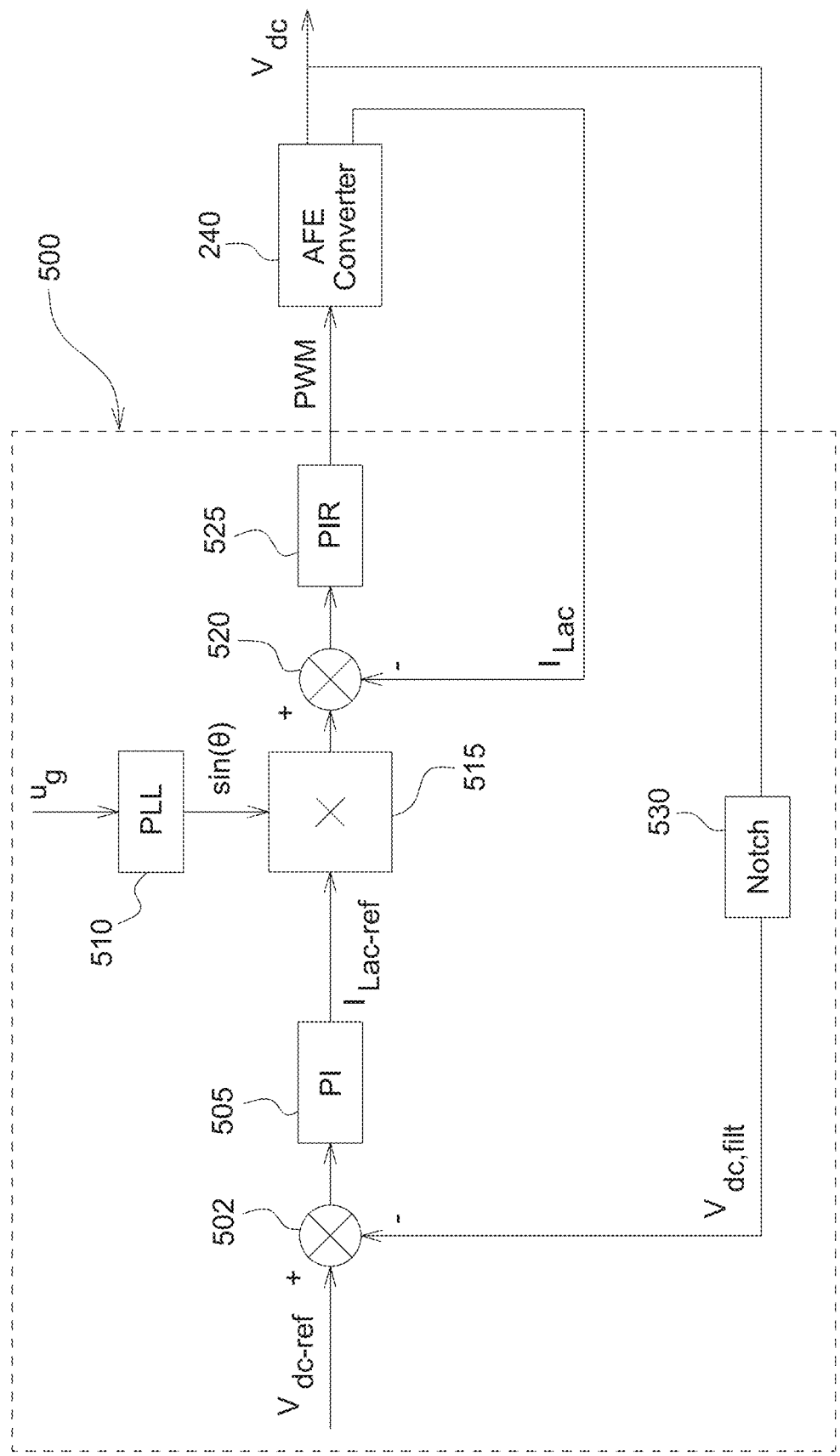
Figure 7:
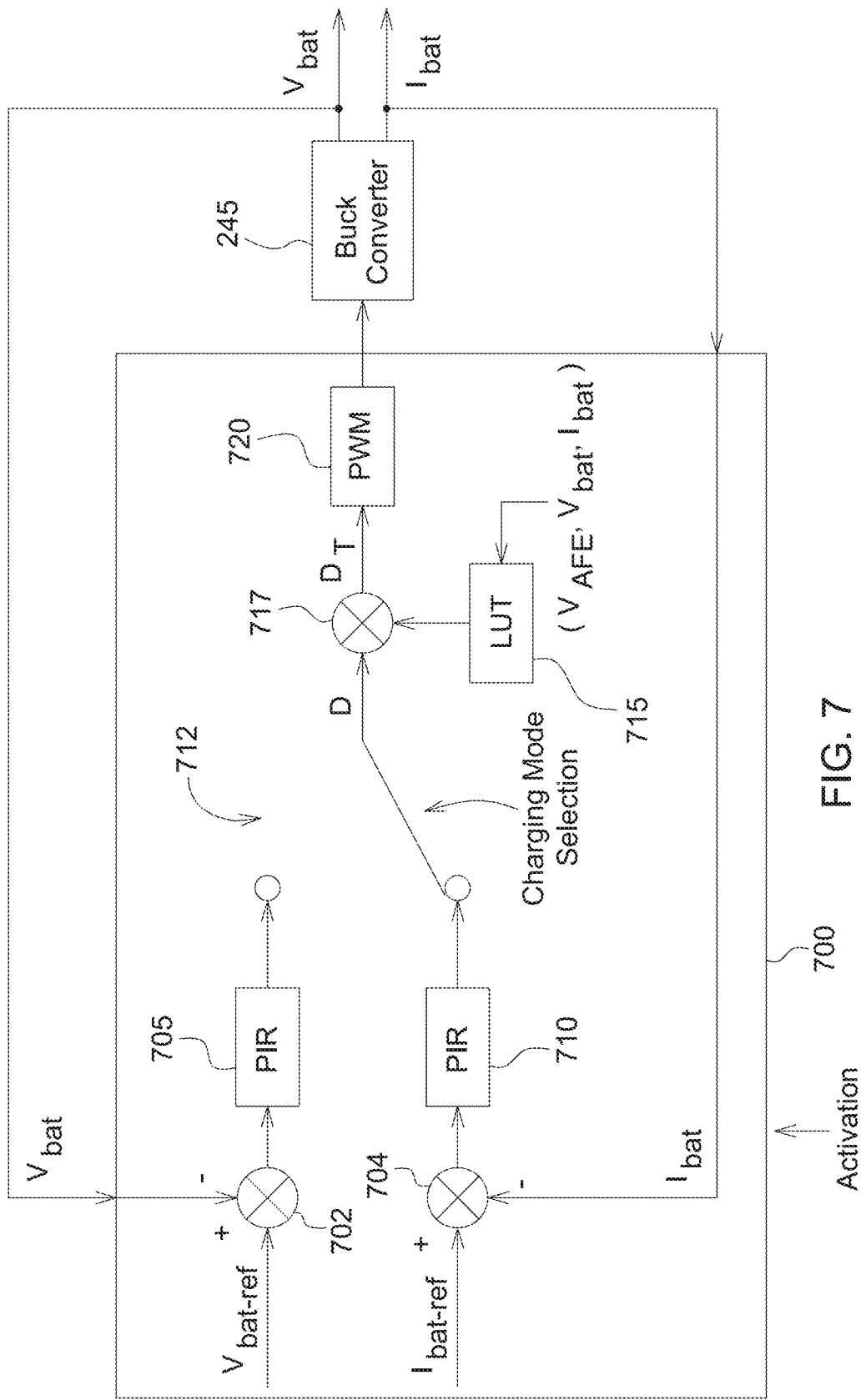

Further details of the controller 115 are also described in at least FIGS. 5 and 7.

In some example embodiments, the DC-link voltage and the output voltage of the AFE converter 240 are the same. The buck converter 245 receives the output voltage of the AFE converter 240 (i.e., the DC-link voltage). The buck converter 245 converts a relatively high voltage (e.g., 80V) to a relatively low voltage (e.g., 48V). For example, the AFE converter 240 converts a 120V/240V AC voltage to 80V DC and then the buck converter 245 converts the 80V DC to 48 V DC.

The buck converter 245 includes the half-bridges 222b, 222c and 232a connected in parallel and the filter 145. The controller 115 may control the half-bridges 222b, 222c and 232a such that they operate as an interleaved DC/DC buck converter.

A double line-frequency voltage ripple at the AFE output and a switching behavior of the buck converter 245 may lead to charging current ripple, and the ripple will appear at the double line-frequency (low-frequency) and a switching frequency respectively (high-frequency).

In example embodiments, the controller 115 uses an interleaving operation in the buck converter 245 stage to reduce the output current ripple. Moreover, a discontinued-conduction-mode (DCM) operation may be achieved in the buck converter 245 to reduce the switching losses.

The DC-DC output filter 145 may include inductors Ldc1, Ldc2, Ldc3 and a capacitor $C_{out}$. A first end of the inductor Ldc1 is connected between the switch packages 84 of the half-bridge 222b. A first end of the inductor Ldc2 is connected between the switch packages 84 of the half-bridge 222c. A first end of the inductor Ldc3 is connected between the switch packages 84 of the half-bridge 232a. A first end of the capacitor $C_{out}$ is connected to the rail 246. Second ends of the inductors Ldc1, Ldc2, Ldc3 and the capacitor $C_{out}$, respectively, are connected to a node1. Node1 is connected to an input terminal of the power supply 150.

To achieve the DCM operation of the buck converter 245, the input voltage $V_{in}$, PWM duty-cycle D, and output voltage $V_{out}$ may satisfy $$V_{out} > D \times V_{in} \qquad (1)$$

where $V_{in}$ is the DC-link voltage (e.g., output voltage of the AFE converter 240), $V_{out}$ is the output voltage $V_{bat}$ of the buck converter 245 (shown in FIG. 2A).

Meanwhile, in the DCM mode, the voltage relationship between the input voltage $V_{in}$ and the output voltage $V_{out}$ is $$V_{out} = \frac{D^2 V_{in}^2 T_s}{D^2 V_{in} T_s + 2LI_{out,avg}}. \quad (2)$$

where $T_s$ is the switching period of the pulse-width-modulation (PWM) control for the buck converter 245 (shown in FIG. 7), L is the output inductance of the buck converter 245, and $I_{out,avg}$ is the average output current.

Thus, the controller 115 may determine the PWM duty-cycle D to use under certain input/output voltages and output current as $$D = \sqrt{\frac{2V_{out}I_{out,avg}}{(V_{in} - V_{out})V_{in}m}}. \quad (3)$$

where $m=T_s/L$ and represents a coefficient.

Based on the DCM in equation (1), the requirement of m can be written as $$m > \frac{2V_{in,min}I_{o,max}}{(V_{in,min} - V_{out})V_{out}}. \quad (4)$$

where $V_{in,min}$ is a minimum DC-Link voltage (i.e., a minimum value of the oscillation within the DC-link voltage), determined by the AFE control. The controlled DC-Link voltage includes a maximum voltage $V_{max}$ and the minimum voltage $V_{min}$ with a double line frequency. In at least some example embodiments, the voltage $V_{min}$ is higher than the output voltage of the DC/DC buck converter 245. $I_{o,max}$ is a maximum allowed current for battery charging where $I_{o,max}$ is determined by a maximum battery charging current or a maximum converter current.

The output inductance may be based on equation (4) above.

Figure 3:
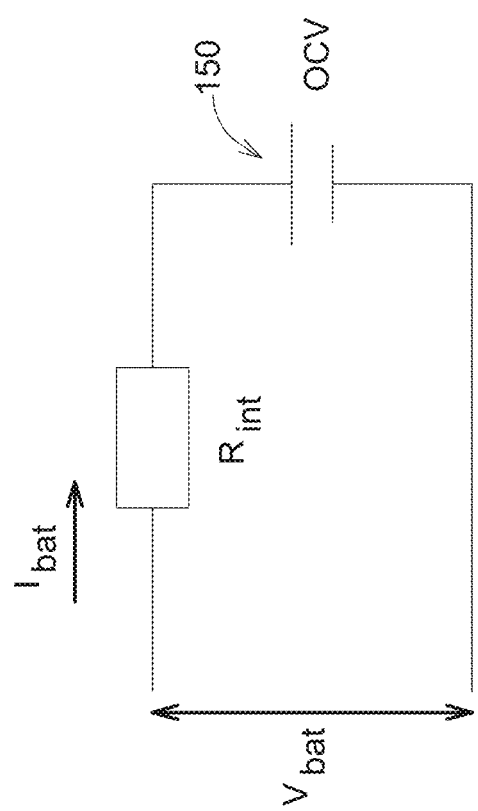

FIG. 3 illustrates a simplified battery model. As shown in FIG. 3, an internal resistance $R_{int}$ of the power supply 150 is connected in series with a voltage source of the power supply 150. In FIG. 3, OCV is the open-circuit-voltage of the power supply 150, which is a function of a state-of-charge (SOC).

Based on the simplified model, a charging current ripple may be defined as $$\Delta I = \Delta V / R_{int}. \quad (5)$$

where $\Delta V$ is the output voltage ripple of the buck converter 245.

The power supply 150 has a low internal resistance $R_{int}$, for example, 33 mo. During operation of the single-phase AFE converter 240 and the buck converter 245, the voltage ripple may concentrate on two frequencies: (1) a double line-frequency and (2) a switching frequency.

The double line-frequency ripple is attenuated by using the capacitance of the DC-link 250, an interleaving buck converter 245 and proportional-integral-resonant (PIR) controller (discussed in FIGS. 5 and 7).

In some example embodiments, the high-frequency voltage (or current) ripple is attenuated with the output capacitor $C_{out}$.

Figure 4A:
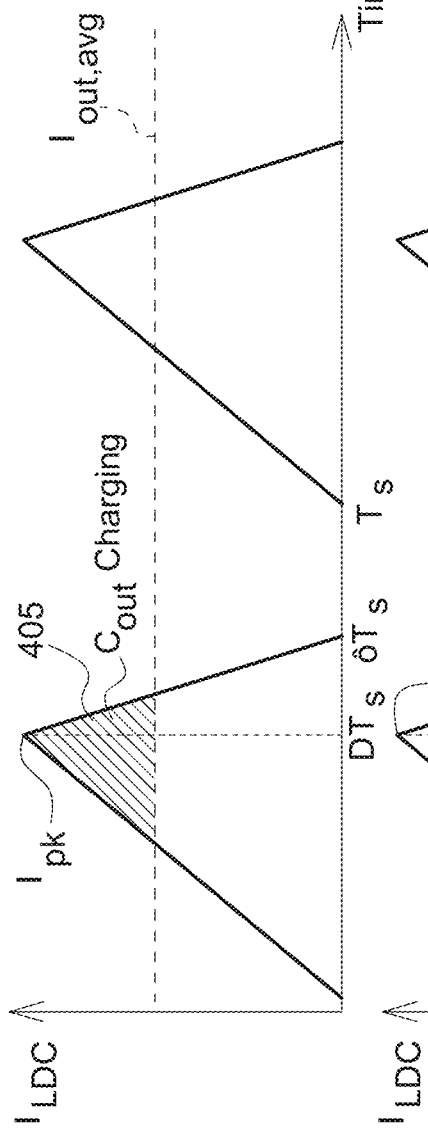
FIG. 4A illustrates a timing diagram for charging and discharging of an output capacitor according to at least one example embodiment.

FIG. 4A illustrates a timing diagram for the charging and discharging of the output capacitor $C_{out}$ according to at least one example embodiment.

FIG. 4A shows an inductor current and average output current of the buck converter at the DCM operation mode.

As shown in FIG. 4A, the output capacitor $C_{out}$ is charged when the inductor current $I_{LDC}$ is greater than an average inductor current $I_{out,avg}$, which is shown as area 405. The inductor current $I_{LDC}$ is a current for a single phase, i.e., a current flowing through one of the inductors $L_{dc1}$, $L_{dc2}$, $L_{dc3}$. Thus, the timing diagram show in FIG. 4A applies to each of the inductors $L_{dc1}$, $L_{dc2}$, $L_{dc3}$.

The average inductor current $I_{out,avg}$ is an average value over time for one inductor and determined by a PWM duty cycle D, input voltage (i.e., output voltage of the AFE converter 240/voltage of the DC-link) and an output voltage $V_{bat}$ of the buck converter 245. The PWM duty cycle D is determined by the controller 115 based on the voltage error $(V_{bat-ref} - V_{bat})$ in constant voltage (CV) mode or the current error $(I_{bat-ref} - I_{bat})$ in constant (CC) mode.

The output capacitor $C_{out}$ may be charged by the DC/DC buck converter 245 when an inductor current $I_{LDC,j}$ is greater than an average inductor current $I_{out,avg}$ with j indicating the particular inductor of the DC/DC buck converter 245.

In a steady-state, the charging energy is equal to the discharging energy as the average voltage across the capacitor is constant. The charging energy 405 can be written as:

$$E = \frac{(I_{pk} - I_{out,avg})\delta T_s \left(\frac{I_{pk} - I_{out,avg}}{I_{pk}}\right)}{2} = C_{out}V_{out}\Delta V = C_{out}V_{out}\Delta IR_{int} \quad (6)$$

where, for each phase (e.g., inductor $L_{dc1}$ and half-bridge 222b, inductor $L_{dc2}$ and half-bridge 222c and inductor $L_{dc3}$ and half-bridge 232a), $I_{pk}$ is a peak current and $\delta T_s$ is the time period of the phase inductor current decreasing to zero after the high side transistor for the phase is turned off.

The peak current $I_{pk}$ may be determined as follows $$\frac{I_{pk}}{(\delta - D)T_s} L = V_{out}. \quad (7)$$

The zero-crossing time of the inductor current $I_{LDC}$ satisfies $$\delta = D + \frac{V_{out}}{I_{pk}}m, \quad D = \sqrt{\frac{2V_{out}I_{out,avg}}{(V_{in} - V_{out})V_{in}m}}. \quad (8)$$

In at least some example embodiments, $\gamma$ is a desired output current ripple and may be determined as:

$$\gamma = \frac{\Delta I_o}{I_{out,avg}}.$$

The output capacitance $C_{out}$ may satisfy $$\frac{(1-D)T_s - 2L\frac{V_{out}I_{out,avg}}{V_{in}^2 D^2}}{C_{out}R_{int}} < \gamma. \quad (9)$$

Equation (9) works when the buck converter is a non-interleaving converter.

In at least some example embodiments, an interleaving operation may attenuate the output voltage ripple as well as output current ripple.

In a conventional buck converter, a diode is used to conduct an inductor current when the active switch is off. In at least some example embodiments, a diode of the bottom MOSFET of a half-bridge serves as a free-wheeling diode. The body-diode may have a large forward voltage, which may cause higher conduction losses compared to use a MOSFET to server as a diode.

In order to reduce a conduction loss, the controller 115 may use synchronous rectification (SR) operation.

Figure 4B:
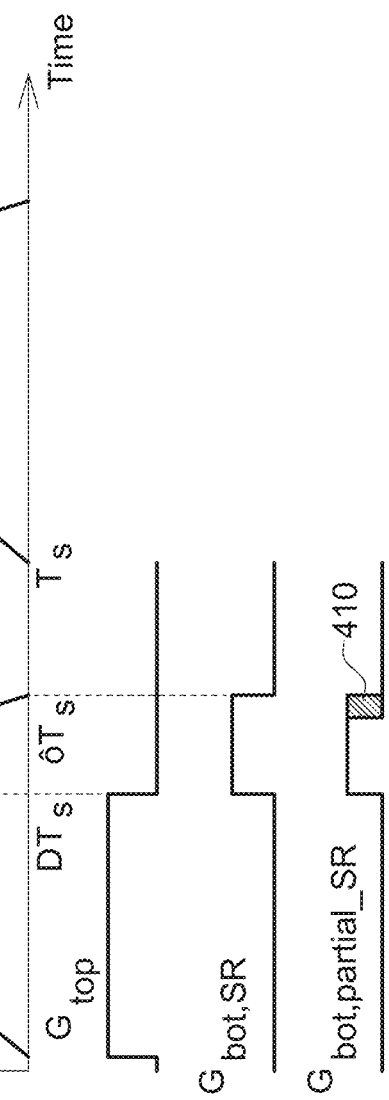
FIG. 4B illustrates gate signals of a half-bridge of the DC/DC buck converter according to at least one example embodiment.

FIG. 4B illustrates gate signals of a half-bridge of the buck converter 245 in a DCM mode.

In an SR operation, the bottom-side 290 MOSFET turns on when the top-side 285 switched is off, i.e., the bottom MOSFET will serve as the diode to conduct a descending inductor current. In the example shown in FIG. 4B, the controller 115 turns off the top-side 285 MOSFET and turns on the bottom-side 290 MOSFET at a time DTs.

In one example embodiment, the controller 115 applies the signal $G_{bot,SR}$ to the bottom-side 290 MOSFET and turns off the bottom-side 290 MOSFET at a time BTS, otherwise the inductor current $I_{LDC}$ will reach negative and introduce an additional loss.

In some example embodiments, current sensors 296 (shown in FIG. 2A) are used to detect the zero-crossing point of the inductor current $I_{LDC,j}$. The current sensor provides current measurements to the controller 115. For each of the inductors $L_{dc1}$, $L_{dc2}$, and $L_{dc3}$, when the current sensor detects a zero-crossing point of the inductor current $I_{LDC}$, the controller 115 turns off the bottom switch at the moment when $I_{LDC}=0$.

In other example embodiments, the controller 115 uses an open-loop calculation to determine a turn-off time of the bottom-side switch package 84. The turn-off time may be determined by the controller 115 as $$\delta = DV_{in}/V_{out} \qquad (10)$$

The duty-cycle D is obtained by the controller 115 and the voltages $V_{in}$ and $V_{out}$ are measured by voltage sensors 298. More specifically, a voltage sensor 298a measures voltage across the DC-link 250 as the voltage $V_{in}$ and a voltage sensor 298b measures a voltage across the output capacitor $C_{out}$ as the voltage $V_{out}$.

Measurement noise may lead to a mismatch between an ideal turn-off time with an actual zero-crossing point, which may lead to a false-trigger of the bottom-side 290 MOSFET.

In at least some example embodiments, to reduce the likelihood of a false-trigger, the controller 115 may apply the signal $G_{bot,\ partial\ SR}$ to the bottom-side 290 MOSFET to add a blanking window 410 to turn off the bottom-side 290 MOSFET earlier than the time $\delta T_s$.

The blanking window may be based on empirical data and measurement accuracy of the voltage sensors 298.

The controller 115 may include an AFE controller and a buck controller.

FIG. 5 illustrates an AFE controller according to at least one example embodiment.

As shown, an AFE controller 500 may include a subtractor 502, a proportion integral (PI) controller 505, a phase-locked-loop (PLL) controller 510, a multiplier 515, a subtractor 520, a proportion-integral-resonant (PIR) controller 525 and a notch filter 530. The AFE controller 500, including the subtractor 502, the proportion integral (PI) controller 505, the phase-locked-loop (PLL) controller 510, the multiplier 515, the subtractor 520, the proportion-integral-resonant (PIR) controller 525 and the notch filter 530 may be implemented as hardware, such as a processor, firmware or hardware executing software as a special purpose machine.

When the AFE controller 500 is hardware, such hardware may include one or more Central Processing Units (CPUs), digital signal processors (DSPs), application-specific-integrated-circuits (ASICs), field programmable gate arrays (FPGAs) computers or the like configured as special purpose machines to perform the functions of the subtractor 502, the proportion integral (PI) controller 505, the phase-locked-loop (PLL) controller 510, the multiplier 515, the subtractor 520, the proportion-integral-resonant (PIR) controller 525 and the notch filter 530. CPUs, DSPs, ASICs and FPGAs may generally be referred to as processors and/or microprocessors.

In the event that the vehicle controller 105 is a processor executing software, the processor is configured as special purpose machine to execute the software to perform the functions of the vehicle controller 105.

As shown in FIG. 5, the subtractor generates a difference between a DC-link reference voltage $V_{dc-ref}$ and a filtered dc-link voltage $V_{dc-filt}$. The PI controller 505 receives the difference the DC-link reference voltage $V_{dc-ref}$ and the filtered dc-link voltage $V_{dc-filt}$ and generates $I_{Lac-ref}$.

The reference voltage $V_{dc-ref}$ may be based on empirical data and preprogrammed. In some example embodiments, the reference voltage $V_{dc-ref}$ may be constant and in other example embodiments, the reference voltage $V_{dc-ref}$ may change based on the input voltage to the AFE converter 240.

The reference current $I_{Lac-ref}$ is based on a voltage tracking error (e.g., $V_{dc-ref} - V_{dc,filt}$), which allows the PIR controller 525 to current track based on the reference current $I_{Lac-ref}$, where $I_{Lac-ref}$ is determined by the AFE controller 500 as $$I_{Lac\_ref} = K_p \times V_{error} + K_i + \int(V_{error}) dt.$$

where $V_{error}$ is $(V_{dc-ref} - V_{dc,filt})$, $K_p$ is the proportional gain of the PI controller 505 and $K_i$ is the integral gain of the PI controller 505.

The PLL controller 510 generates a sin(θ) output based on a grid voltage $u_g$. The grid voltage grid voltage $u_g$ includes two types of information: amplitude and phase where θ is the phase information of the grid voltage $u_g$. The multiplier 515 multiplies $I_{Lac-ref}$ by sin(θ). The subtractor 520 determines a difference between the product generated by the multiplier and $I_{Lac}$. The difference determined by the subtractor 520 is input to the PIR controller 525. Using the difference determined by the subtractor 520, the PIR 525 generates pulse-width-modulation (PWM) signals to the AFE converter 240. Measurements of the dc-link voltage $V_{dc}$ (voltage of DC-link 250) and the current $I_{Lac}$ are input into the AFE controller 500. The notch filter 530 filters the dc-link voltage $V_{dc}$ to generate the filtered dc-link voltage $V_{dc-filt}$.

The controller 115 controls the AFE converter 240 to operate in an interleaving mode. More specifically, the controller 115 generates PWM signals such that two phases are used. A first phase includes the inductor 206a and half-bridges 212a and 212c. A second phase includes the inductor 206b and the half-bridges 212b and 222a. The controller generates PWM signals for the half-bridges 212a-212c and 222a such that the phase shift angle between the two phases is 180 degrees, which can reduce the phase current ripple and improve the current quality.

During a fundamental cycle of the grid, the output capacitor of the AFE converter 240 (i.e., the DC-link 250) will be charged and discharged, and the charging energy may be $$E = P_{AFE}/\omega_{grid}. \qquad (11)$$

where $P_{AFE}$ is the output power of the AFE converter 240, and $\omega_{grid}$ is a fundamental frequency of the grid.

The energy stored in the dc-link capacitor 250 can be written as $E_{cap}=0.5CV^2$, and the double line-frequency voltage ripple on the output voltage of the AFE converter 240 can be $$E \approx C_{dc}(V_{max}-V_{min})V_{avg} \tag{12}$$

where $C_{dc}$ is the output capacitance of the AFE converter 240, i.e., the dc-link capacitance, $V_{max}$ and $V_{min}$ are the AFE output voltage maximum and minimal values respectively, and $V_{avg}$ is the average output voltage of the AFE converter 240. The average output voltage $V_{avg}$ may be measured using voltage sensors, and averaging the measured voltage during one wave cycle at the fundamental frequency (e.g., 60 Hz).

In example, if the output power of the AFE converter 240 is 900 W and the dc-link capacitance is 2.7 mF, the output voltage ripple is about ±6 V if the average output voltage of the AFE converter 240 is 70 V.

In other example embodiments, a virtual d-q frame control may be used to control the output voltage of the AFE converter 240.

An outer loop of the controller 500 is a voltage loop to regulate the output voltage of the AFE converter 240.

The notch filter 530 may be used to reduce a sensitivity of the controller 500 to the output double line-frequency ripples. In at least some example embodiments, a transfer function of the notch filter 530 is $$\text{Notch}(s) = \frac{s^2 + 2\omega_{filt}\xi_2 s + \omega_{filt}^2}{s^2 + 2\omega_{filt}\xi_1 s + \omega_{filt}^2}. \tag{13}$$

where $\omega_{filt}$ is a notch frequency (e.g., 120 Hz), $\xi_1$ and $\xi_2$ are damping ratios.

A depth and a width of the notch filter 530 are controlled by the selection of the damping ratios $\xi_1$ and $\xi_2$. The damping ratios $\xi_1$ and $\xi_2$ may be determined based on a desired width and depth of the notch filter 530.

Figure 6:
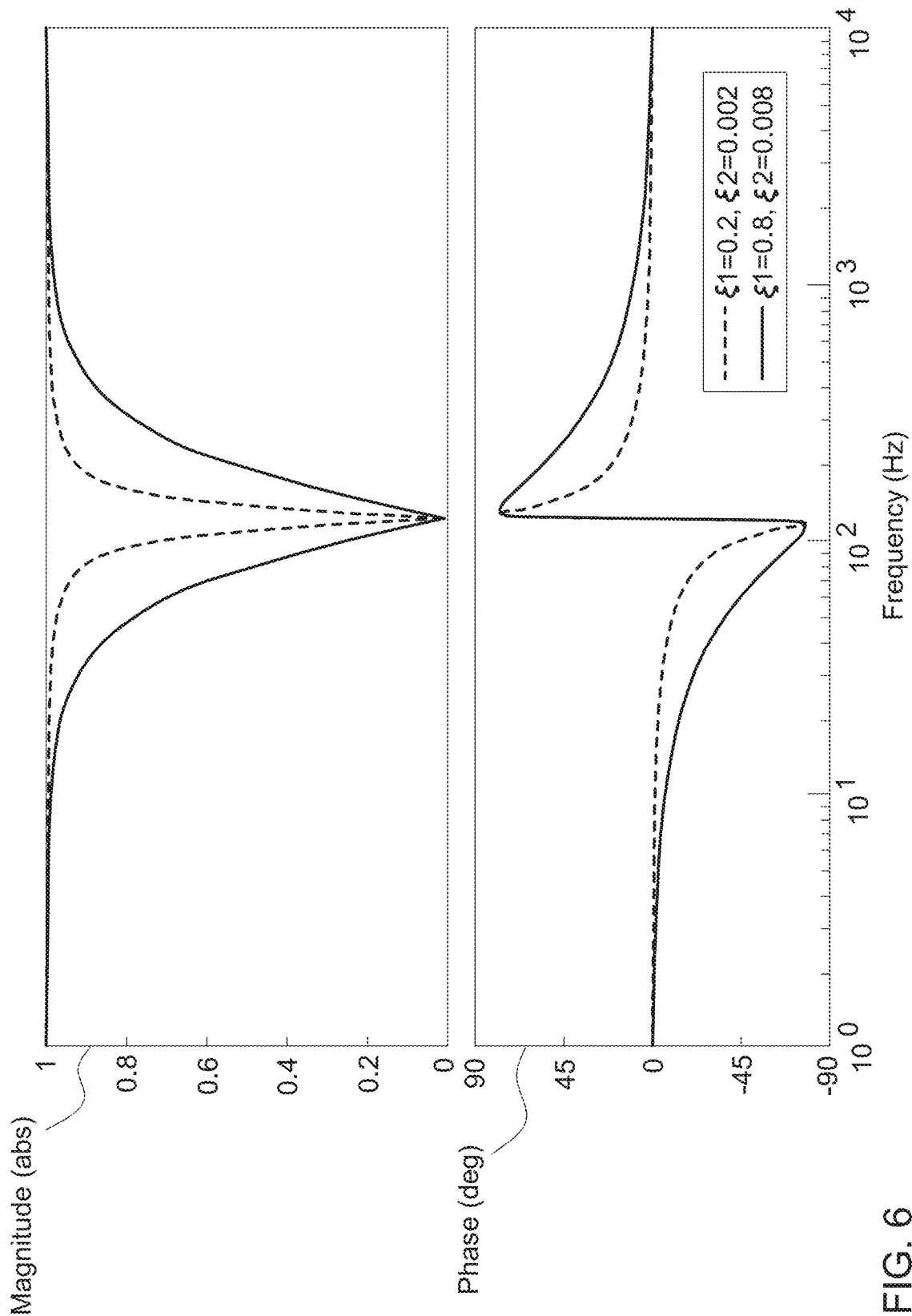

FIG. 6 illustrates a frequency response of the notch filter 530 with different damping ratios $\xi_1$ and $\xi_2$ according to example embodiments.

Referring back to FIG. 5, the PLL controller 510 is used to obtain phase information of the AC grid voltage. This permits the reference AC current $I_{Lac-ref}\sin(\theta)$ to be in phase with the grid voltage by multiplying $I_{Lac-ref}$ by $\sin(\theta)$ for the unity power factor control.

The proportional-integral-resonant (PIR) controller 525 is used to track the reference AC current $I_{Lac-ref}\sin(\theta)$ (e.g., a 60 Hz current), as the resonant control term of the PIR controller 525 may increase a controller gain at the resonant frequency, and thus, the tracking error at the resonant frequency will be reduced.

A transfer function of the PIR controller 525 is $$PIR(s) = K_p + \frac{K_i}{s} + \frac{K_r \omega_{res} s}{s^2 + 2\xi_{res}\omega_{res}s + \omega_{res}^2}. \tag{14}$$

where $K_p$ and $K_i$ are gains of the PIR controller 525, $K_r$ is the gain of the resonant term, $\omega_{res}$ is the resonant frequency, which is 60 Hz in the PIR controller 525 and $\xi_{res}$ is the damping ratio of the resonant term. The gains $K_p$, $K_i$ and $K_r$ and the damping ratio $\xi_{res}$ are determined based on empirical data and/or frequency-domain design techniques such as stability margin analysis.

At the resonant frequency, the controller 115 determines the gain of the resonant term to be $K_r/2\xi_{res}$, so both decreasing the damping ratio $\xi_{res}$ or increasing the gain $K_r$ may improve the tracking accuracy.

In the cascaded control structure as described with reference to FIG. 5, a power factor can be controlled by adding an offset on the grid phase information $\sin(\theta)$. Then the reference AC current $I_{Lac-ref}\sin(\theta)$ will be shifted. For example, by adding 30 degrees phase offset to the output of the PLL controller 510, the power factor can be changed to 0.866.

FIG. 7 illustrates a buck controller according to at least one example embodiment.

As shown in FIG. 7, a buck controller 700 includes a subtractor 702, a subtractor 704, a PIR controller 705, a PIR controller 710, a switch 712, a look-up table (LUT) 715, a adder 717 and a PWM generator 720. The buck controller 700, including the subtractor 702, the subtractor 704, the proportion integral (PI) controller 705, the PIR controller 710, the switch 712, the look-up table (LUT) 715, the adder 717 and the PWM generator 720 may be implemented as hardware, such as a processor, firmware or hardware executing software as a special purpose machine.

When the buck controller 700 is hardware, such hardware may include one or more Central Processing Units (CPUs), digital signal processors (DSPs), application-specific-integrated-circuits (ASICs), field programmable gate arrays (FPGAs) computers or the like configured as special purpose machines to perform the functions of the subtractor 702, the subtractor 704, the proportion integral (PI) controller 705, the PIR controller 710, the switch 712, the look-up table (LUT) 715, the adder 717 and the PWM generator 720. CPUs, DSPs, ASICs and FPGAs may generally be referred to as processors and/or microprocessors.

The buck controller 700 may operate as a constant voltage (CV) charging controller or a constant current (CC) charging controller based on a mode signal. As will be shown and described with reference to FIGS. 8A-8D, the buck controller 700 may operate in one of the CV or CC mode based on a state-of-charge (SOC) of the power supply 150. For example, when the SOC is relatively low (e.g., less than 90%), the CC mode is used to charge the power supply 150 with a constant charging current. When the state-of-charge is relatively high (e.g., above 90%), CV mode may be used.

In the CV mode, the subtractor 702 determines a difference between a power source reference voltage $V_{bat-ref}$ and the buck converter output voltage $V_{bat}$. The power source reference voltage $V_{bat-ref}$ may be equal to (or substantially similar) to a battery open-circuit voltage when the battery state-of-charge is 100%, i.e., fully charged.

The PIR controller 705 generates a duty cycle based on the difference determined by the subtractor 702 and applies the duty cycle D to the adder 717.

The LUT 715 is used to predict the PWM duty cycle based on the input/output voltage and output DC current of the Buck converter. The value in the lookup table can be determined through experiment characterization or calculated using the equation (3).

The LUT 715 provides a base value of the duty-cycle D. In the DCM operation, the relationship between applied duty-cycle and output voltage may be nonlinear. Thus, a LUT may be tuned to provide a base value of a duty-cycle based on voltage reference, an actual output voltage and a current. Then the tuning of the PIR controller will be much easier, since the PIR controller only needs to compensate the tracking error that the LUT cannot cover.

The output of the adder 717 is a duty-cycle signal $D_T$, which is the duty-cycle D plus the base value output by the LUT 715.

In the CC mode, the subtractor 704 determines a difference between a power source reference current $I_{bat-ref}$ and the buck converter output current $I_{bat}$. The power source reference current $I_{bat-ref}$ may be a set value and based on a datasheet of the power supply 150. The PIR controller 710 generates a duty cycle based on the difference determined by the subtractor 704 and applies the duty cycle D to the adder 717.

Eq. (3) provides an equation for duty-cycle. However, considering the circuit parasitic parameters, deadtime, and uncertainties, this equation may not always provide a desired output voltage. Thus, the PIR controllers 705, 710 are used to provide voltage tracking and current tracking, respectively. The PIR controllers 705, 710 receive a voltage tracking error ($V_{bat-ref}-V_{bat}$) and a current tracking error ($I_{bat-ref}-I_{bat}$), respectively, then generate a corresponding duty-cycle to reduce the tracking error and attempt to remove the tracking error.

In both the CC and CV modes, the PWM generator 720 applies the PWM signals to the buck converter 245 based on the output of the adder 717.

More specifically, the controller 700 generates the PWM signals to control the buck converter 245 as a three phase interleaving buck converter. Each phase leg (i.e., for each phase) includes a half-bridge leg and a filter inductor. For example, a first leg includes the half-bridge 222b and the inductor $L_{dc1}$. A second leg includes the half-bridge 222c and the inductor $L_{dc2}$. A third leg includes the half-bridge 232a and the inductor $L_{dc3}$.

The controller 700 generates carriers that are used to generate the PWM signal such that they are shifted 120 degrees between each phase leg. The phase-shifted carriers can reduce the output DC current ripples of the buck converter and improve the output current quality.

The buck controller 700 attenuates the double line-frequency ripples.

The power source reference current $I_{bat-ref}$ and the power source reference voltage $V_{bat-ref}$ signals, as well as the mode signal, may be obtained from a battery-management-system (BMS). An example BMS includes AN1086 Orion BMS, but is not limited thereto.

As described earlier, the buck converter 245 may operate in the DCM mode, and the voltage relationship between the input and output voltages is nonlinear. In some example embodiments, the controller 700 uses a feedforward term to improve a dynamic response of the buck converter 245 and compensate for the nonlinearity.

The output voltage of AFE converter 240, i.e., the input voltage of the Buck converter, may contain double line-frequency ripples.

In the buck converter controller 700, the PIR controllers 705 and 710 are used to attenuate an impact of input double line-frequency voltage ripples, and the resonant frequency of the controller 700 is set as the double line-frequency (e.g. 120 Hz) to reject the input voltage ripple.

Figure 8A:
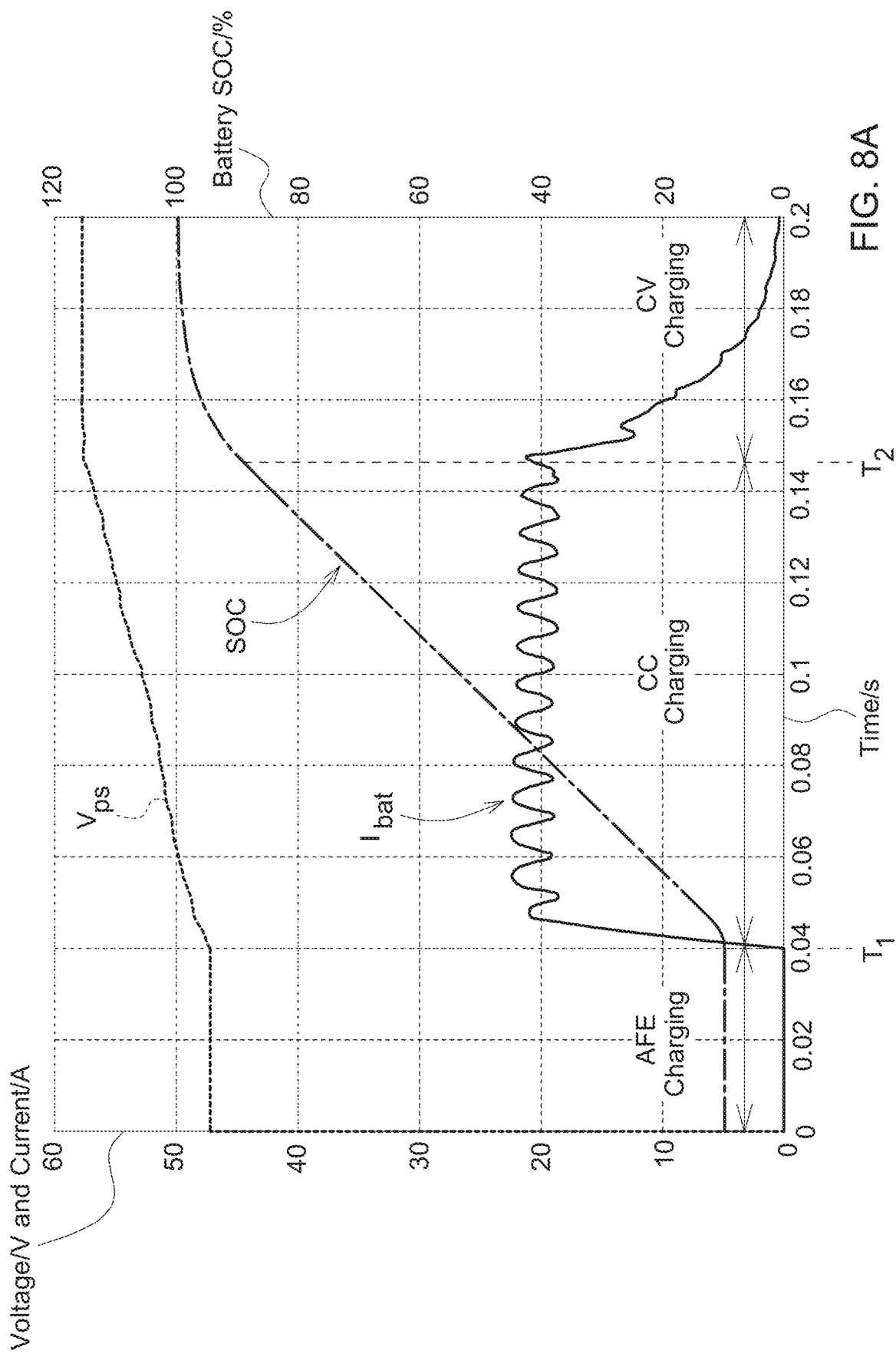

The buck converter controller 700 operates based on an activation signal generated by the controller 115. More specifically, and as shown in FIG. 8A, the controller 115 monitors a voltage $V_{dc}$ across the DC-link 250 using a voltage sensor 298a. The controller 115 controls the AFE converter 240 to charge the DC-link 250. Once the controller 115 determines the voltage $V_{dc}$ reaches a threshold level (e.g., becomes relatively stable) in the charging mode, the controller 115 generates the activation signal to enable the buck converter 245 to operate and charge the power supply 150.

FIGS. 8A-8D illustrate a charging operation, where the AFE converter and buck converter use an interleaving operation and reduce the output current ripple.

FIG. 8A illustrates an operation of the charging and drive control circuitry 130 of vehicle system 10 in the charging mode according to an example embodiment. In FIG. 8A, the vehicle system 10 operates in an AFE charging period until a time $T_1$ (e.g., when the DC-link voltage $V_{dc}$ reaches a threshold level). During the AFE charging period, the AFE converter 240 generates a voltage at the DC-link 250.

During the AFE charging period, there may be no current flowing from the buck converter 245 into the power supply 150.

At $T_1$, the buck controller 700 causes the buck converter 245 to operate in a CC mode. The AFE 240 may continue to operate in a same manner to maintain the DC-link voltage $V_{dc}$.

This causes the current $I_{bat}$ to be generated which charges the power source (shown by an increasing power source voltage $V_{PS}$).

At $T_2$, the buck controller 700 switches to the CV mode when the SOC reaches a threshold percentage. For example, a voltage sensor may provide feedback to the controller 700, and the SOC can be calculated based on the battery terminal voltage measured through the voltage sensor. The buck controller 700 may generate the mode signal (shown in FIG. 7) based on whether the SOC exceeds the threshold level. In an example embodiment, the threshold of the SOC may be 95%.

The CV mode causes the current $I_{bat}$ to decrease such that the power source voltage $V_{PS}$ remains constant.

Figure 8B:
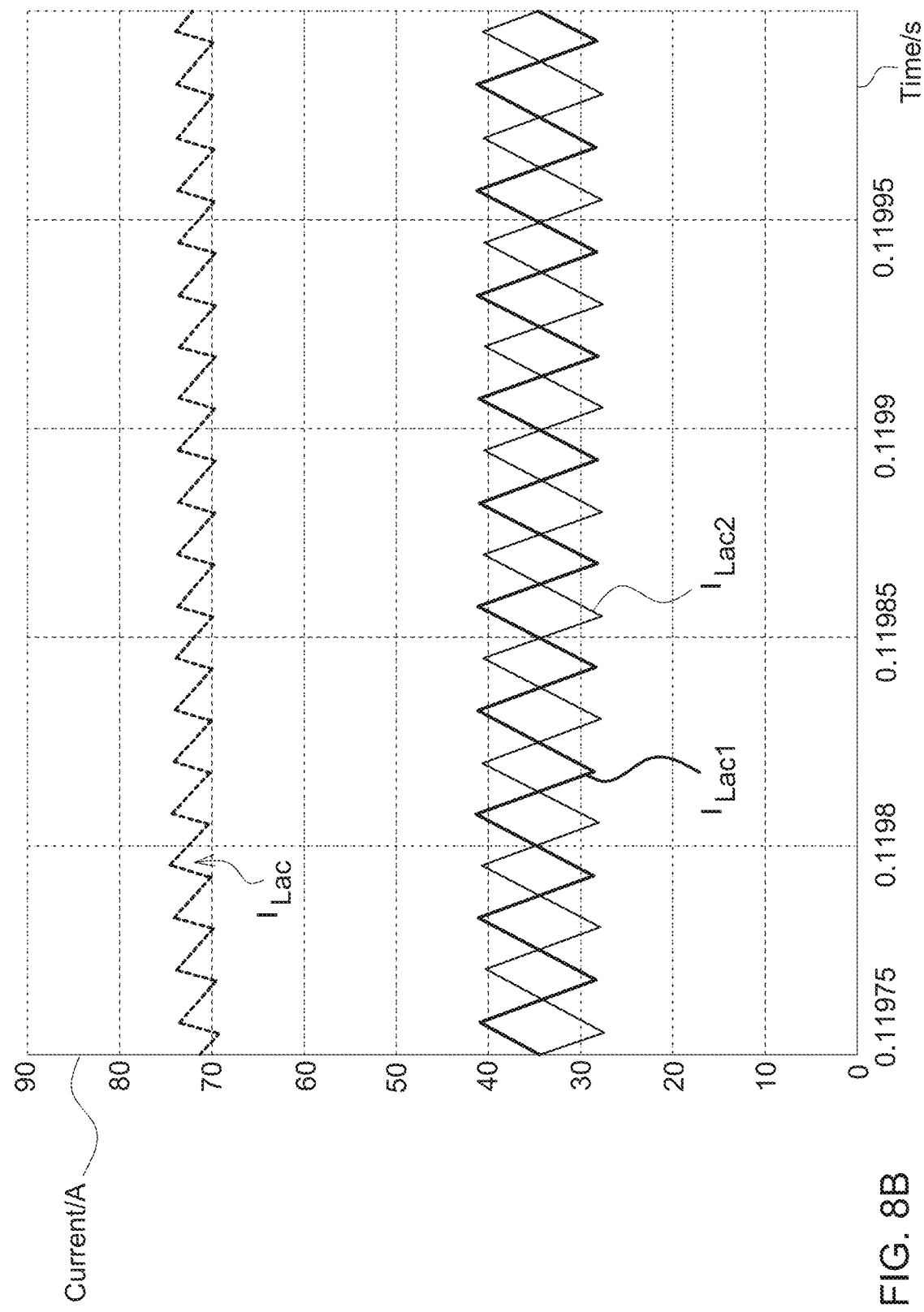

FIG. 8B illustrates a timing diagram of an example interleaving method for the AFE converter 240. The AFE controller 500 generates the PWM signals such that the input currents of the first leg (the current $I_{Lac1}$) and the second leg (the current $I_{Lac2}$) are separated by 180 degrees.

Figure 8C:
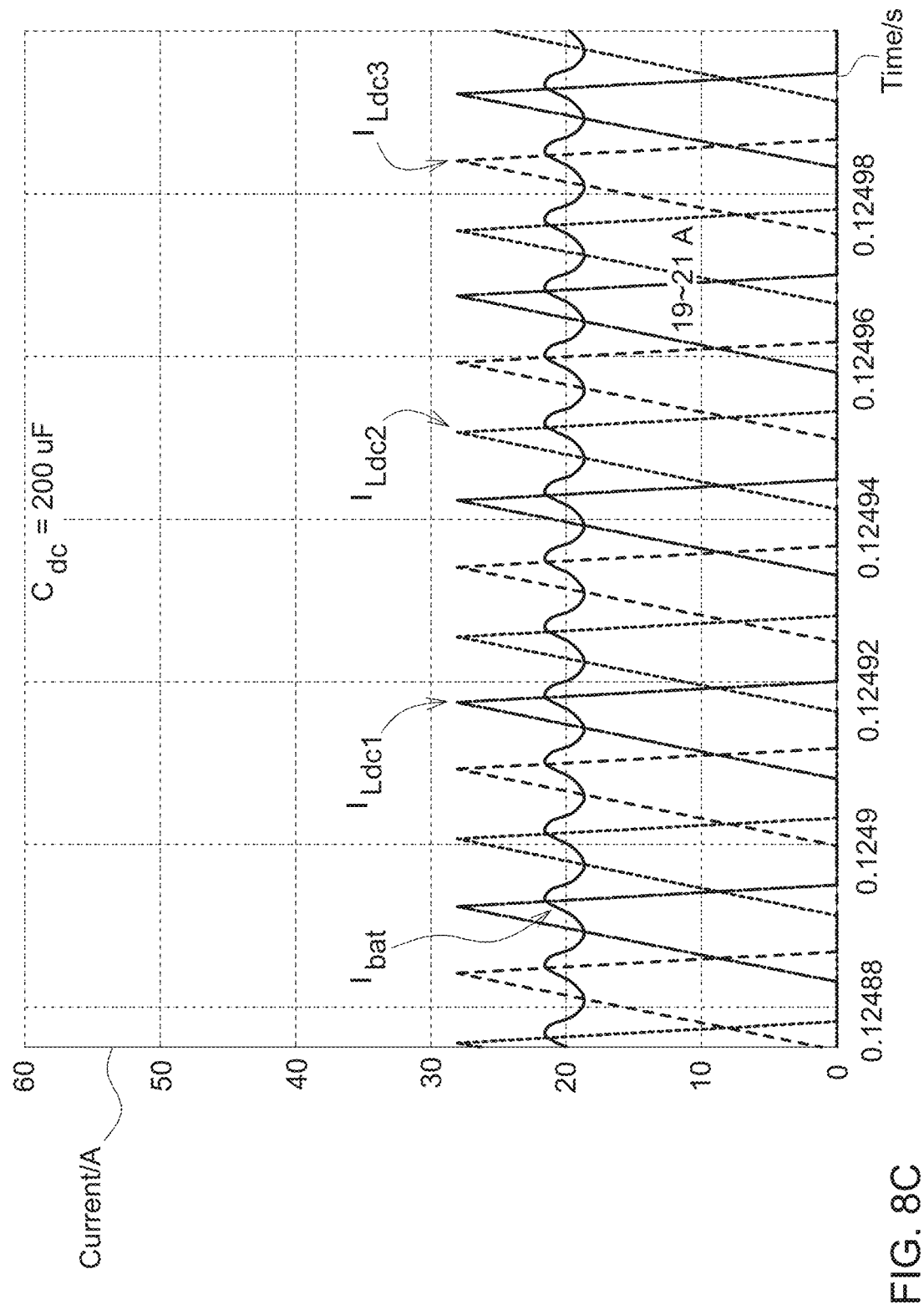

FIG. 8C illustrates a timing diagram of an example interleaving method in a CC mode for the buck converter 245 when the inductor $L_{bat}$ is not included in series with the power supply 150. In the example shown in FIG. 8C, the capacitance $C_{dc}$ may be 200 µF. The buck controller 700 generates the PWM signals such that the output currents of the first leg (the current $I_{Ldc1}$), the second leg (the current $I_{Ldc2}$) and the third leg ($I_{Ldc3}$) are separated by 120 degrees, which reduces the ripple in the current $I_{bat}$.

Figure 8D:
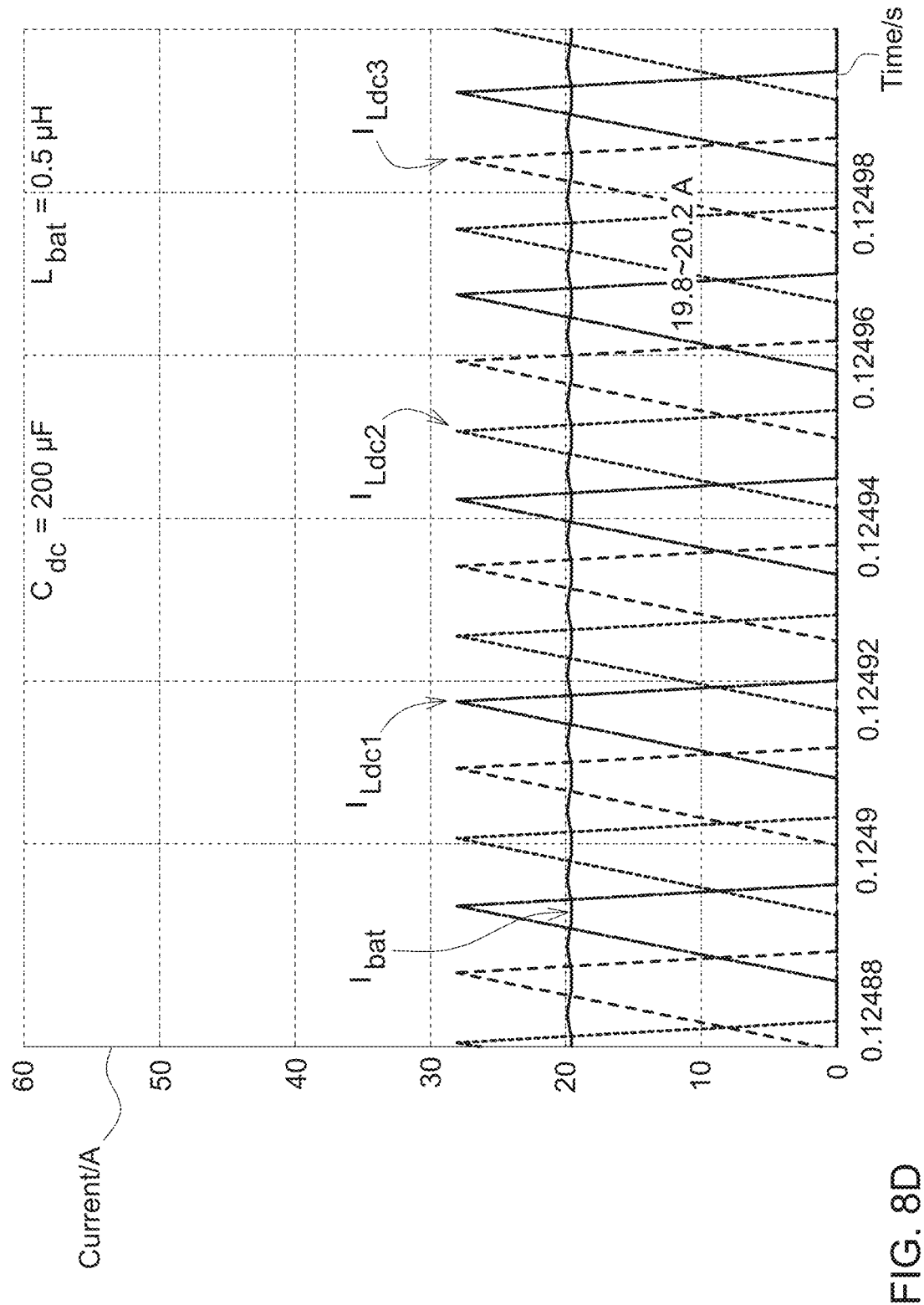

FIG. 8D illustrates a timing diagram of an example interleaving method for the buck converter 245 when the inductor $L_{bat}$ is included in series with the power supply 150. In the example shown in FIG. 8D, the capacitance $C_{dc}$ may be 200 µF and the inductance of the inductor $L_{bat}$ may be 0.5 µH.

In FIG. 8D, the buck controller 700 generates the PWM signals such that the output currents of the first leg (the current $I_{Ldc1}$), the second leg (the current $I_{Ldc2}$) and the third leg ($I_{Ldc3}$) are separated by 120 degrees. The inclusion of the inductor $L_{bat}$ causes the ripple in the current $I_{DC}$ to be further reduced.

Referring back to FIG. 2B, when the controller 105 controls the control circuit 110 to be in the traction mode, each switch package 84 is switched on and off to generate the three phases from the DC-link 250 to the motors. For example, the switch packages 84 of the first inverter 210 are switched on and off to generate the three phases for the motor 260. The filter 145 and the transformer and line filter 135 become operably disconnected from the inverters 210, 220 and 230.

The inverters 210, 220 and 230 are controlled using known methods to convert DC power from the power supply 150 into AC power for the motors 260, 270 and 280, respectively, during the traction mode.

Example embodiments being thus described, the same may be varied in many ways. Such variations are not to be regarded as a departure from the spirit and scope of example embodiments, and all such modifications as would be obvious to one skilled in the art are intended to be included within the scope of the claims.

What is claimed is:

1. A system comprising:
   a plurality of inverters configured to operate in at least one of a charging mode or a drive mode;
   a plurality of motors; and
   at least one controller configured to,
   selectively couple the plurality of inverters to the plurality of motors during a drive mode, and
   selectively couple at least one of the inverters to an alternating current (AC) source during the charging mode and decouple the at least one of the inverters from the plurality of motors during the charging mode.

2. The system of claim 1, wherein the plurality of inverters includes a first inverter,
   a first portion of the first inverter is configured to operate as part of an AC to direct current (DC) converter during the charging mode, and
   a second portion of the first inverter is configured to operate as part of a DC-DC converter.

3. The system of claim 2, wherein the second portion of the first inverter includes at least one half-bridge, the at least one half-bridge including a first transistor and a second transistor, wherein the at least one controller is configured to activate and deactivate the first transistor and the second transistor using a synchronous rectification based method.

4. The system of claim 3, wherein the at least one controller is configured to activate the second transistor when the first transistor is deactivated in a discontinued-conduction-mode (DCM) operation.

5. The system of claim 4, wherein the at least one controller is configured to deactivate the second transistor before an inductor current is zero in the discontinued-conduction-mode (DCM) operation.

6. The system of claim 2, wherein the at least one controller is configured to control the first portion of the first inverter during the charging mode based on a DC bus reference voltage.

7. The system of claim 6, wherein the at least one controller includes a proportional-integral-resonant (PIR) controller, a proportional-integral (PI) controller, phase-locked-loop (PLL) controller and a notch filter.

8. The system of claim 2, wherein the charging mode includes a constant current (CC) mode and a constant voltage (CV) mode and the at least one controller is configured to cause the system to operate in a CC mode or CV mode during the charging mode.

9. The system of claim 8, wherein the at least one controller includes two proportional-integral-resonant (PIR) controllers for the CC mode and CV mode operation during the charging mode, and a look-up table.

10. The system of claim 2, further comprising:
    a battery; and
    an inductor (L) and capacitor (C)-type or an LCL-type low-pass filter, the LC-type or the LCL-type low-pass filter being connected between the battery and the DC-DC converter.

11. The system of claim 1, further comprising:
    a transformer to convert AC voltage from the AC source from a first AC voltage to a second AC voltage.

12. The system of claim 1, wherein the plurality of inverters includes a dual inverter or a triple inverter.

13. The system of claim 1, wherein the system comprises:
    an interleaved single-phase AC-DC converter during the charging mode; and
    an interleaved DC-DC buck converter during the charging mode.

14. A non-transitory computer-readable medium, when executed by at least one controller, configured to cause a vehicle system to,
    selectively couple a plurality of inverters to a plurality of motors during a drive mode, and
    selectively couple at least one of the inverters to an alternating current (AC) source during a charging mode and decouple the at least one of the inverters from the plurality of motors during the charging mode.

15. The non-transitory computer-readable medium of claim 14, when executed by the at least one controller, is configured to cause the vehicle system to execute a proportional-integral-resonant (PIR) controller, a proportional-integral (PI) controller, phase-locked-loop (PLL) controller and a notch filter.

16. The non-transitory computer-readable medium of claim 14, when executed by the at least one controller, is configured to cause the vehicle system to operate in one of a constant current (CC) mode or a constant voltage (CV) mode during the charging mode.

* * * * *